Patented Sept. 22, 1936

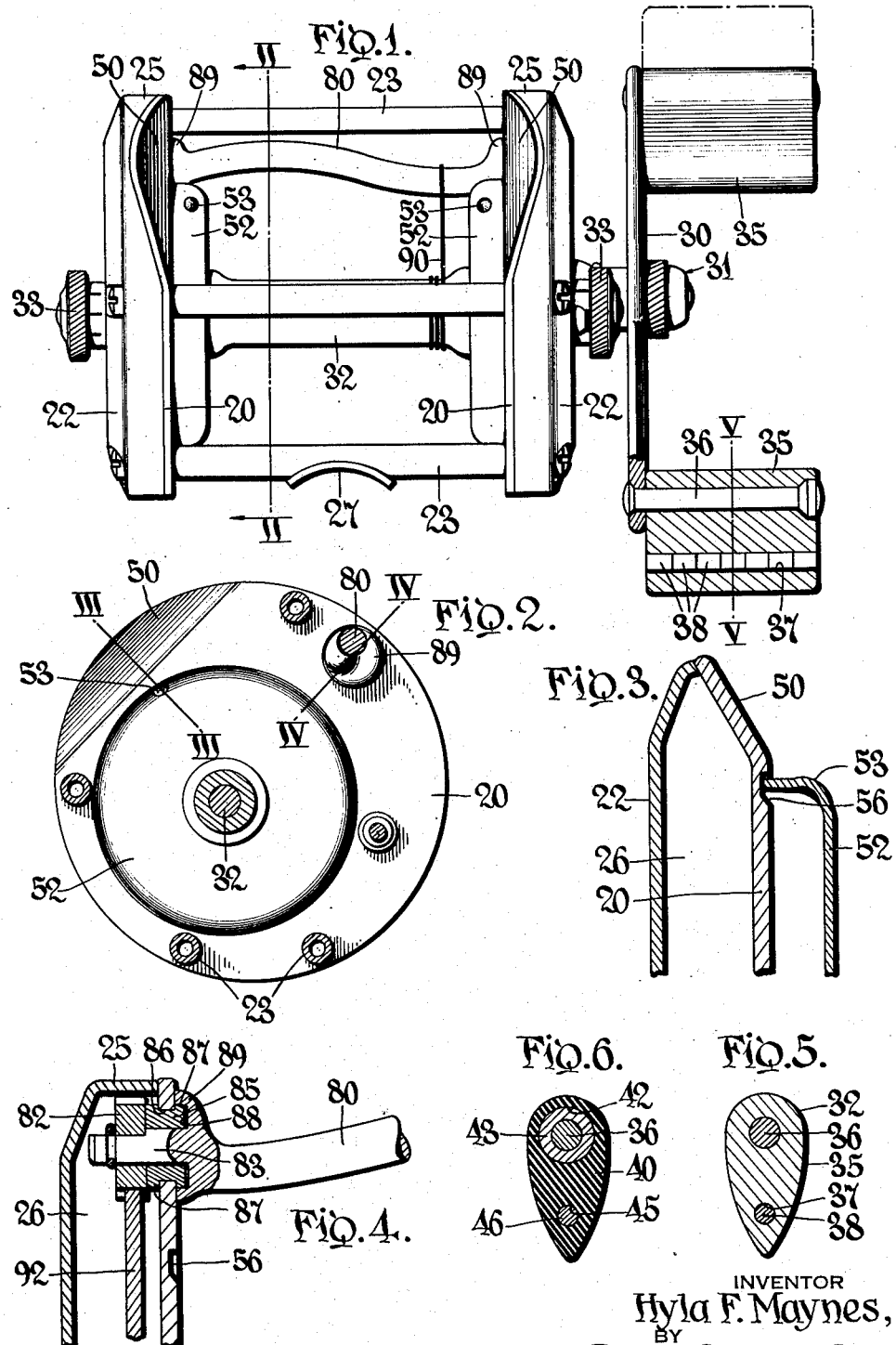

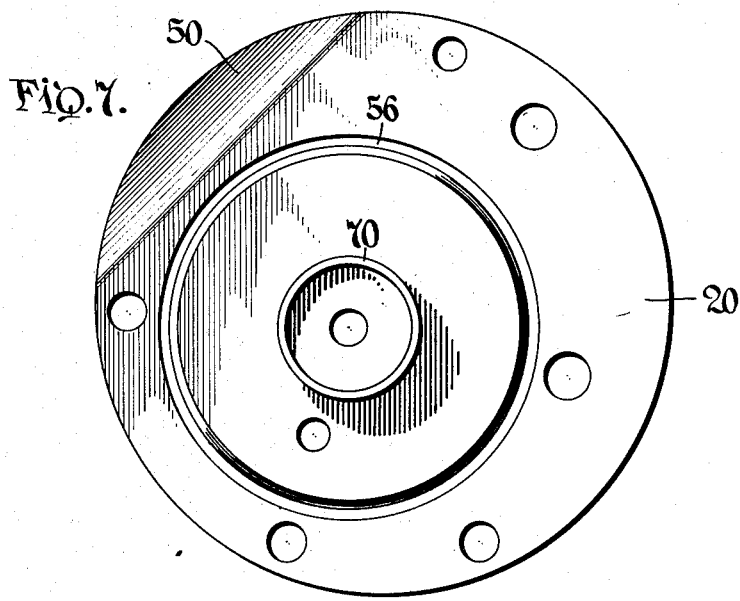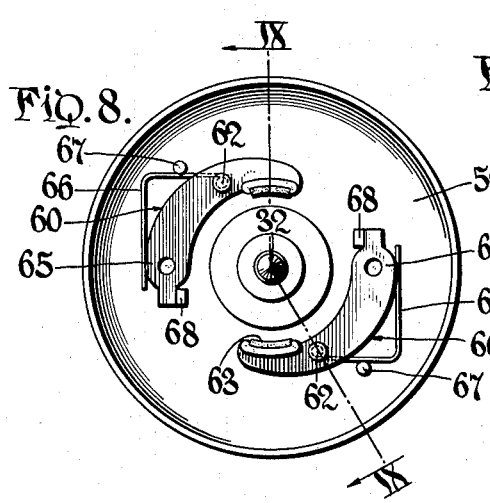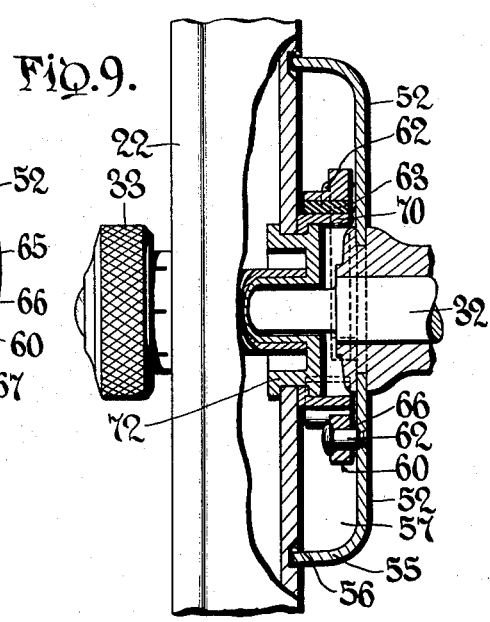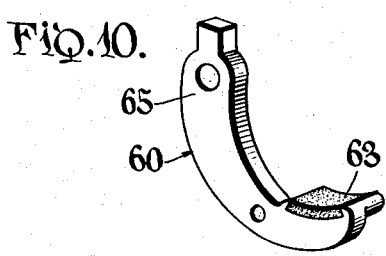

2,055,358

UNITED STATES PATENT OFFICE 2,055,358

FISHING REEL

Hyla F. Maynes, North Tonawanda, N. Y., assignor of one-half to Emma C. Maynes, North Tonawanda, N. Y.

Application May 23, 1936, Serial No. 81,492

21 Claims. (Cl. 242—84.1)

This invention relates to fishing reel structure and it has particular relation to structure for controlling the operating mechanism of a fishing reel.

One object of the invention is to provide a reel structure in which braking elements are installed for operation in such manner that the degree of braking action on the reel spool shaft is automatically controlled according to the rate of rotation of such shaft.

Another object of the invention is to provide in a fishing reel construction a braking mechanism for the spool shaft which is responsive to air resistance and centrifugal force of rotating parts to influence the rate of rotation of the shaft or spool.

Another object of the invention is to provide an improved reel in which mechanism is so arranged as to facilitate manual braking action upon the reel spool and is responsive delicately to touch sensitiveness of the hand of the operator.

Another object of the invention is to provide improved structure for associating a level wind shaft of a reel with supporting end heads or plates.

In the operation of fishing reels, especially in regard to accuracy and smoothness in casting, the operator often employs the thumb for pressing or lightly touching the end flanges or shields of the spool for the purpose of graduating the spinning of the spool, or in some cases, the operator allows his thumb to touch the convolutions of the fishing line on the spool for this purpose.

One of the features of this invention involves the structure of end plates or casings adjacent the spool shields wherein thumb guides are formed at the natural position of the thumb upon the reel as the operator holds the fishing rod handle, and the thumb, practically without conscious effort and automatically, falls into proper position for touching the shield at one end portion of the spool. The shield portion at the location adjacent the thumb guide is embossed or beaded in such manner that a very light touch can be uniformly applied or graduated according to the desires of the operator. It is to be understood that the term embossing, or beading, or the like, is not intended to be restricted in meaning to peculiar shape as to length or width, but it may include a protuberance extending the same distance in all directions. The thumb guide can be incorporated adjacent each end of the spool for the purpose of accommodating both right and left handed operators.

When the reel spool has been fully wound with line the diameter of the wound portion is much greater than the diameter of this portion after the line has been substantially unwound, and such diameter constantly changes while the line is being wound upon or unwound from the spool. The tension of the line is applied tangentially of the wound mass of line and it is apparent that the leverage varies materially from the maximum diameter to the minimum diameter of the line convolutions. Less force is required to rotate the spool by tensioning the line from a fully wound spool than the force required to rotate the spool by tensioning the line from a spool from which most of the line has been unwound.

One of the features of the invention involves braking mechanism which is designed to compensate for the differences in leverages of the kind just mentioned. Centrifugally operated brake members are installed upon the spool and are responsive to the rotation thereof for applying braking action to a drum that is carried upon a stationary part of the reel. At maximum speed of rotation of the spool the maximum braking action occurs. Thus at the beginning of the casting operation the spool is prevented automatically from over-running and as the spool slackens its speed the braking elements automatically release to provide for free unwinding of the line as the casting lure thereon approaches its destination. This arrangement is particularly adapted to secure the maximum distance in casting operations, while the thumb guides and beaded spool shield can be employed to facilitate accuracy in casting at targets, as well as for other purposes.

Another feature of the invention is exemplified in flat or paddle-like handles which are eccentrically mounted in freely pivoted relation upon the ends of the reel crank. When the reel crank is rotating each handle approaches or attains a substantially radial position with respect to the axis of rotation of the crank. The handles thus insure a fanning or paddle-like action and the air resistance thereon as a result of this action provides a braking influence upon the rotating reel spool. The handles are influenced by air resistance which tends to pivot them out of radial alinement in opposition to centrifugal force that tends to dispose the handles radially of the axis of rotation of the crank. As the rate of rotation decreases the eccentric handles trail their pivotal connections to reduce the air resistance, or approach tangential relation with respect to the circular path described by the pivotal connections thereof, or at very slow rate of rotation the handies hang downwardly from their pivotal supports on the crank.

In the drawings:

Fig. 1 is a rear elevation of a fishing reel having the features of the invention incorporated therein;

Fig. 2 is a vertical section taken substantially along the line II—II of Fig. 1;

Fig. 3 is a fragmentary cross section, on a larger scale, taken substantially along the line III—III of Fig. 2;

Fig. 4 is a fragmentary cross section, on a larger scale, taken substantially along the line IV—IV of Fig. 2;

Fig. 5 is a cross section of a reel handle and taken substantially along the line V—V of Fig. 1;

Fig. 6 is a cross section similar to Fig. 5 and illustrating another form of reel handle;

Fig. 7 is a side elevation of an inner end plate of the fishing reel shown in Fig. 1;

Fig. 8 is an end elevation of a reel spool and shaft assembly including braking elements installed therein;

Fig. 9 is a fragmentary view partially in section and partially in elevation, the section thereof being taken substantially along the line IX—IX of Fig. 8; and Fig. 10 is a perspective, on a larger scale, of one of the braking members shown in Fig. 8.

In practicing the invention a pair of parallel disk-like heads or end plates 20 are assembled with cup shaped end casings 22 by means of spacing bars or fastening bolts 23 disposed through both the plates and casings adjacent their outer marginal portions for holding them in rigidly assembled relation. These plates, casings, and bars constitute a supporting frame for the operating parts of the reel mechanism. Inwardly turned flanges 25 of the casings abut the plates 20 adjacent their marginal edges to provide closed chambers or housings 26 in which gearing and other operating elements are disposed in the manner shown and described in detail in my prior Patents No. 2,027,306 dated January 7, 1936, and No. 2,040,777, dated May 12, 1936, and hence detailed description thereof is not necessary for a thorough understanding of this invention.

Adjacent bars 23 are rigidly secured to a saddle 27 adapted to be mounted upon a fishing rod (not shown) for the purpose of supporting the reel in a conventional manner suitable for its normal operation.

A spool driving double crank 30 is rotatably mounted in a bearing support 31 forming a part of the frame structure of the reel and is connected in a manner described in detail in my patents mentioned above to a line winding spool shaft 32 that is rotatably mounted in bearing supports 33 carried in the reel frame.

Handles 35 which are pivotally connected in eccentric relation to pins 36 carried in the outer ends of the crank are somewhat flat and taper toward their outer edges. The pivotal connection of each handle to the pin 36 is located adjacent one edge thereof, and when the crank is rotated the handle tends to stand out radially of the axis of rotation of the crank and, in this position, serves as a paddle or fan to provide a braking action that is induced by resistance of the air. As the speed of rotation diminishes the handles 35 pivot about their pivotal pin supports 36 at angles to the radii drawn from the axis of rotation of the crank through the pins 36. Thus the wind resistance diminishes according to the decrease in speed of rotation and the operation of the crank is more uniformly controllable. For purposes of adjustment the handles 35 are provided with recesses 37 in which weights 38 can be inserted in varying numbers to vary the effect of the air resistance with respect to the centrifugal force of the handles as they rotate with the crank.

As best shown in Fig. 6, a handle attachment 40 which is fan-like to correspond in shape substantially to each handle 35, can be applied to a handle 43 of a conventional fishing reel. This handle attachment 40 is composed of resilient material and an opening 42 adjacent one edge portion thereof is formed substantially according to the shape of a conventional reel handle 43 and the attachment handle 40 can be stretched to facilitate inserting the handles into the openings, or conversely the reel handle 43 can be forced into the opening and the material will be stretched thereover in snugly fitting relation. Each conventional handle 43 is rotatable on the pin 36 of the crank, and is barrel-shaped.

Each of the handle attachments 40 is provided with a weight receiving opening 45 adjacent an edge thereof opposite the handle receiving opening 42 and one or more weights 46, like weights 38, can be inserted therein to vary the responsiveness of the attachments to centrifugal force and wind resistance upon rotation of the crank.

The end plates 20 and casings 22 of the reel structure are provided with recesses or thumb guides 50 which are disposed adjacent opposite end portions of the spool shaft 32 and shields 52 are secured upon the spool shaft to form a part of the spool structure. Outwardly struck beads 53 are formed upon the outer circumferential portions of the shields and these beads can be touched by the thumb of the reel operator to provide for manual braking action on the spool shaft and thus insure refined manual control. These guides 50 are formed by bending or inclining portions of the end plates 20 and gradually reducing the width of the flanges 25 in curved relation, as shown in Fig. 1. A thumb guide and beading are provided adjacent opposite ends of the spool for the purpose of adapting the reel for both right handed and left handed operators. This arrangement is of exceptional importance in casting at targets where accuracy to a great extent depends upon sense of touch in controlling the rotation of the spool. One or more of the beads 53 can be provided upon each shield 52, but it has been found that very satisfactory results can be secured with one bead on each shield.

Since there is a definite intermittent touch of the thumb upon the bead as the spool rotates and the striking of the bead against the thumb is more sensitively felt than a continuous surface, the rotation of the spool can be very delicately controlled and shaded in the phases of casting in which this type of control is desirable.

As best shown in Fig. 9, each shield 52 is cuplike in form and a circumferential flange 55 thereof rotates in an annular groove 56 formed in the end plate 20. This arrangement provides for a chamber 57 in which a plurality of brake members 60 are disposed and provided with pivotal connections 62 intermediate their ends upon the rotatable wall of the shield. One end portion of each brake member is provided with a brake shoe 63 of fibrous or other conventional brake lining material, and the other end portion 65 is weighted either by concentration of material or by providing the pivotal connection 62 nearer the end supporting the brake shoe. Each brake member 60 which is arcuate in form has a spring 66 connected at one end of the latter to the pivotal connection 62. Each spring is angular in form and its other end portion bears upon the weighted or longer arm of the brake member 60. This spring is constantly held under tension by a lug 67 against which it is sprung and normally, or while the spool is not rotating, the spring maintains the weighted end 65 of each brake member against a stop 68 provided rigidly upon the inner face of the shield 52.

A brake drum 70 is rigidly mounted axially of the spool shaft 32 and upon the wall or end plate 20 in conjunction with a sleeve 72 that is rigidly mounted in this end plate 20. When the spool shaft 32 is rotated the brake members rotate therewith and, under the influence of centrifugal force, the weighted or longer end portions 65 of these members move outwardly to pivot each brake member in a clockwise direction, as viewed in Fig. 8, about the pivotal connection 62 until the brake shoe 63 engages the brake drum. The centrifugal force overcomes the resistance of the spring 66, but as soon as the speed of rotation diminishes a predetermined degree, the spring moves the brake member to disengage the brake shoe from the drum.

This arrangement of braking device is desirable because it tends to insure uniform and efficient operation of the spool shaft according to the rate the fishing line is being unwound from the spool. For example, when the spool is fully wound with line the leverage defined by radial distance from the point where the line is being unwound to the axis of the shaft, is materially different from the leverage after the line is unwound almost to its end. Therefore, it is apparent that without the braking arrangement, a uniform tension upon the line would result in a considerable variation in speed of rotation of the spool as the diameter of the line windings on the spool varies.

The brake members impose a retarding influence upon the rotation of the spool shaft above predetermined speed and prevents over-running of the spool in casting while permitting free rotation of the spool as the casting lure or lug approaches its destination.

A level wind shaft 80 similar to that shown in the patents referred to above, is provided with a pinion 82 (Fig. 4) non-rotatably secured upon one end thereof and a bearing portion 83 of the spiral shaft is rotatable in a bearing sleeve 85 that is rigidly mounted adjacent the outer marginal portion of the end plate 20 through an opening 86 therein. Flanges 87 of the sleeve are spun over the material of the end plate defining the opening 86 and the flange 87 on the outer side of the end plate is disposed in an annular groove 88 formed in an enlarged or flanged portion 89 of each end portion of the spiral shaft. In this arrangement the marginal or outer circumferential portion of each flange 89 lies substantially flush against the adjacent surface of the end plate 20 and a fishing line 90 which is guided from end to end of the spool by the spiral shaft is prevented from sliding laterally beyond the flanges 89 under normal conditions of reeling in the line. When the line is played out rapidly it will whip rapidly from end to end of the spool and might tend to come to rest at the junction of one of the flanges 89 with the end plate 20. However, the fitting of the flange in the manner specified prevents catching or fouling of the line 90 at this location and the line is, on the other hand, guided to its proper position on the level wind shaft.

This interfitting and overlapping arrangement of the flanges 87 and 89 also provides an effective water shed. When the fishing line is wet and sheds water upon the spiral shaft 80 incidentally to the operation of the reel, such water will drop or flow from the shaft away from the edges of each flange 89, and even when the reel is tilted to such position that one of the ends of the shaft 80 is disposed downwardly, the water will flow therefrom away from the bearing sleeve or support 85.

It is to be understood that the level wind shaft 80 is driven in oscillations in the manner shown and described in detail in the patents mentioned above. One element 92 of the driving mechanism associated with the crank and spool shaft is shown in Fig. 4 of the drawings, and it is believed that the operation of the device is clear without proceeding further with the detailed description thereof.

It is also to be understood that the term "flat" or "substantially flat" employed in describing and claiming each eccentrically mounted handle 35 or 40 does not necessarily mean that the opposite fanning sides of the handle are plane surfaces, but the term is intended to include any handle which is wider transversely from edge to edge than its thickness, and which is pivotable outwardly about its eccentric mounting to provide fan-like action during the rotation of the crank. The handle 35 can be described as being of blade form in that it cuts and fans the air during rotation of the crank.

Although convenient and practical structure for proper operation of the fishing reel embodying the invention has been shown and described in detail, it will be apparent to those skilled in the art that the invention is not so limited, but that various changes can be made therein without departing from the spirit of the invention or from the scope of the appended claims.

I claim:

1. In a fishing reel having frame structure at each end portion thereof, a line winding spool rotatably carried in the frame structure, means formed in the frame structure for guiding an operator's hand into contact with the spool, and touch sensitive means formed on the spool for contact with the operator's hand in response to guiding of the latter thereto.

2. In a fishing reel, a spool shaft for receiving fishing line wound thereon, plate members disposed adjacent opposite ends of the shaft and rotatably supporting the latter, means for maintaining the plate members in rigid relation, one of said plate members having a depression sloped inwardly toward the spool for guiding the hand of an operator, said spool shaft including a flange rotatable adjacent the guide depression for contacting the hand of the operator guided by said depression.

3. In a fishing reel having frame structure at each end portion thereof, a line winding spool shaft rotatable in said frame structure, shields rigid with the shaft adjacent each end thereof, one of said shields having an embossed portion adjacent its outer periphery, said frame structure adjacent one end of the shaft having a recessed guiding portion leading toward the path of rotation of the embossed portion of the shield for directing an operator's thumb into braking contact with the shield.

4. In a fishing reel having oppositely disposed end plates, means for maintaining the end plates in rigid substantially parallel relation, said end plates having portions flaring outwardly toward their marginal portions to form guides, a line winding spool rotatable with respect to the end plates and having end shield flanges rotatable adjacent the inclined guides, said flanges having outwardly embossed portions for contact with an operator's thumb guided in said guides.

5. In a fishing reel having frame structure, rotatable members carried in said structure and including a crank member for winding and unwinding a fishing line in the reel, a substantially flat handle member pivotally connected adjacent one marginal portion thereof to an end portion of the crank member, and a removable weight member carried in a marginal portion of the handle member opposite the pivotal connection thereof.

6. In a fishing reel having frame structure, rotatable members carried in said structure and including a crank member for winding and unwinding a fishing line in the reel, a substantially flat handle member pivotally connected adjacent one marginal portion thereof to an end portion of the crank member, and a plurality of selectively removable weight members carried in a marginal portion of the handle member opposite the pivotal connection thereof.

7. In a fishing reel having frame structure, rotatable members carried in said structure and including a crank member operable for winding a fishing line in the reel, a handle rotatable on an end portion of the crank member, and an auxiliary handle of blade form removably and eccentrically connected to the first mentioned handle for rotation therewith.

8. In a fishing reel having frame structure, rotatable members carried in said structure and including a crank member operable for winding a fishing line in the reel, a handle rotatably supported upon an end portion of the crank member, and an auxiliary handle of blade form having an eccentric recessed portion for receiving the first mentioned handle in frictionally engaged relation therein whereby the both handles are rotatable as a unit upon the crank member.

9. In a fishing reel having frame structure, rotatable members carried in said structure and including a crank member operable for winding a fishing line in the reel, a handle rotatably supported upon an end portion of the crank member, and an auxiliary handle of blade form composed of resilient material and having an eccentric recessed portion stretchable to receive the first mentioned handle in yieldably gripped relation therein, whereby the both handles are rotatable as a unit upon the crank member.

10. In a fishing reel having frame structure, means in the structure for winding a fishing line thereon, a level wind shaft rotatable in the frame structure for guiding a fishing line to and fro on said means, a bearing support for said shaft carried in the frame structure and having an annular portion projecting beyond the surface of said structure, and a flange on an end portion of the shaft substantially flush with respect to the frame structure and having an annularly recessed portion receiving therein the projecting annular portion of the bearing support.

11. In a fishing reel having frame structure, means in the structure for winding a fishing line thereon, a level wind shaft rotatable in the frame structure for guiding a fishing line back and forth on said means, a bearing sleeve for said shaft carried in the frame structure and having end portions projecting on opposite sides of a wall of said frame structure in turned relation against said sides, and a radial flange on said end portion of the shaft having a marginal portion substantially flush with an adjacent wall surface of the frame structure and having an annularly recessed portion receiving a projecting end portion of the bearing sleeve.

12. In a fishing reel having frame structure, a spool shaft rotatable in the frame structure, a crank member rotatable in the frame structure and connected to the spool shaft for rotating the latter, a substantially flat handle member pivotally connected adjacent one marginal portion thereof to an end portion of the crank member and constituting an air brake to influence the rotation of the spool shaft, a guide in the frame structure for guiding a portion of an operator's hand into braking contact with a portion of the spool shaft, a brake drum carried by said frame structure, brake members movable in a predetermined path on said spool shaft relative thereto in response to centrifugal force generated by rotation of the shaft above predetermined speed for actuating said brake members into contact with the brake drum, and yieldable means maintaining the brake members out of contact with the brake drum upon rotation of the shaft below said predetermined speed.

13. In a fishing reel including a stationary frame structure, a line winding spool rotatably carried in the frame structure, said structure having a depressed surface extending from a location adjacent a portion of the spool outwardly toward the periphery of the frame structure for receiving and guiding a portion of the hand of an operator in manually applying braking action to the spool.

14. In a fishing reel including frame structure, a line winding spool rotatable in said frame structure, a brake drum carried by said frame structure, brake members movable in a predetermined path on said spool relative thereto in response to centrifugal force generated by rotation of the spool above predetermined speed for actuating said members into contact with the brake drum, yieldable means maintaining the brake members out of contact with the brake drum upon rotation of the shaft below said predetermined speed, and a guideway in the frame structure for directing a portion of an operator's hand into braking contact with a portion of the spool shaft and modifying the action of said brake members.

15. In a fishing reel, end members formed with substantially vertical walls adjacent opposite reel ends and disposed transversely of the axis of the reel, means for holding the end members in rigid spaced relation, a line winding spool extending rotatably through said walls transversely thereof, one of said walls having formed therein a depressed guiding portion sloping inwardly toward the reel axis for directing a portion of an operator's hand toward a portion of the rotatable spool.

16. In a fishing reel, end members formed with substantially vertical walls adjacent opposite reel ends and disposed transversely of the axis of the reel, means for holding the end members in rigid spaced relation, a line winding spool extending rotatably through said walls transversely thereof, one of said walls having formed therein an outwardly sloping portion extending from a location adjacent the junction of the spool therewith toward the outer marginal portion of the latter wall for guiding a portion of an operator's hand into frictional contact with the spool.

17. In a fishing reel having frame structure, a spool rotatable in the frame structure for receiving a fishing line wound thereon, a crank member rotatable in the frame structure and connected to the spool for rotating the latter, said crank member including a portion extending radially from its axis of rotation, and a handle member of blade form having a connecting inner marginal portion and an opposite free edge, said handle member having a pivotal connection along its connecting marginal portion with the radial crank portion to form an air resistance brake member extendable outwardly in response to rotation of the crank member and into substantially radial alignment with the radial portion of the crank member.

18. In a fishing reel having frame structure, a spool rotatable in the frame structure, a crank member rotatable in the frame structure and connected to the spool for rotating the latter, and a centrifugal air resistance brake in the form of a substantially flat handle member having an inner marginal pivotal connection suspending it to an outer end portion of the crank member and responsive to centrifugal force generated by rotation of said crank member to dispose the free outer handle edge remote from the pivotal connection in substantially outward radial alignment with the crank member.

19. In a fishing reel having frame structure, a crank member rotatable in the frame structure and having oppositely disposed radial portions extending from its axis of rotation, and an air resistance brake member in the form of a substantially flat handle member pivotally suspended by an inner marginal portion thereof to each radially disposed crank portion and responsive to centrifugal force generated by rotation of said crank member to dispose opposite edge portions of each handle member in substantially radial alignment with the radial portions of the crank member.

20. In a fishing reel, end members formed with walls adjacent opposite reel ends and disposed transversely of the axis of the reel, means for holding said end members in rigid spaced relation, a line winding spool extending rotatably through said walls transversely thereof, a guide formed in one of said walls and extending from a location adjacent the spool outwardly toward the margin of the latter wall for directing a portion of an operator's hand toward the adjacent portion of the rotatable spool, a crank member rotatable in said end members and connected to the spool for rotating the latter, said crank member including a portion extending radially from its axis of rotation, and a handle member having inner and outer edges, said handle member having pivotal connection along its inner edge with the radial crank portion to form an air resistance brake member extendable outwardly in response to rotation of the crank member into substantially radial alignment with the radial portion of the crank member.

21. In a fishing reel, end members formed with walls adjacent opposite reel ends and disposed transversely of the axis of the reel, means for holding said end members in rigid spaced relation, a line winding spool extending rotatably through said walls transversely thereof, a guide formed in one of said walls and extending from a location adjacent the spool outwardly toward the margin of the latter wall for directing a portion of an operator's hand toward the adjacent portion of the rotatable spool, a brake drum carried by one of said end members, brake members carried by the spool and movable in a predetermined path on said spool relative thereto in response to centrifugal force generated by rotation of the spool above predetermined speed for actuating said members into contact with the brake drum, and yieldable means maintaining the brake members out of contact with the brake drum upon rotation of the shaft below said predetermined speed.

HYLA F. MAYNES.